(12) United States Patent
Carlebach et al.

(10) Patent No.: US 6,712,300 B2
(45) Date of Patent: Mar. 30, 2004

(54) METHODS AND APPARATUS FOR A QUICK-CHANGE SPOOL SYSTEM

(75) Inventors: Adam Carlebach, Oakland, CA (US); Bryan Grziwok, San Francisco, CA (US); Phil Halbert, Oakland, CA (US); Jennifer Michalek, Ann Arbor, MN (US)

(73) Assignee: Better Fishtrap, Inc., Piedmont, CA (US)

( * ) Notice: Subject to any disclaimer, the term of this patent is extended or adjusted under 35 U.S.C. 154(b) by 0 days.

(21) Appl. No.: 10/316,960

(22) Filed: Dec. 10, 2002

(65) Prior Publication Data

US 2003/0136868 A1 Jul. 24, 2003

Related U.S. Application Data

(60) Provisional application No. 60/339,218, filed on Dec. 10, 2001.

(51) Int. Cl.$^7$ .................. A01K 89/00; A01K 89/01; A01K 89/015
(52) U.S. Cl. .................. 242/318; 242/322; 242/902
(58) Field of Search .................. 242/318, 322, 242/323, 902

(56) References Cited

U.S. PATENT DOCUMENTS

| | | | |
|---|---|---|---|
| 1,366,340 A | | 1/1921 | Anderson |
| 2,863,616 A | | 12/1958 | Hutchison et al. |
| 2,865,662 A | | 12/1958 | Nurmse |
| 2,942,799 A | * | 6/1960 | Meulnart ............... 242/318 |
| 3,074,665 A | | 1/1963 | Morrow |
| 3,565,362 A | * | 2/1971 | Lilland et al. ............ 242/322 |
| 3,674,069 A | | 7/1972 | Hawley |
| 3,693,901 A | | 9/1972 | Lilland et al. |
| 3,765,618 A | | 10/1973 | Johnson et al. |
| 3,958,769 A | | 5/1976 | Miyamae |
| 4,076,185 A | * | 2/1978 | Dorph ............... 242/118.41 |
| 4,196,864 A | | 4/1980 | Cole |
| 4,461,435 A | | 7/1984 | Kovalovsky |
| 4,535,953 A | | 8/1985 | Omori |
| 4,856,730 A | | 8/1989 | Jorgensen |
| 5,120,003 A | * | 6/1992 | Sacconi ............... 242/317 |
| 5,195,699 A | * | 3/1993 | Stinnette ............... 242/322 |
| 5,372,322 A | | 12/1994 | Fortson |
| 5,456,418 A | | 10/1995 | Hitomi |
| 5,607,114 A | | 3/1997 | Henriksson |
| 5,906,329 A | * | 5/1999 | Wesley, Sr. ........... 242/390.8 |
| 5,911,378 A | * | 6/1999 | Plestan ............... 242/322 |
| 6,015,111 A | * | 1/2000 | Berke ............... 242/394 |
| 6,065,699 A | | 5/2000 | Sacconi |
| 6,224,011 B1 | * | 5/2001 | Gavaza, III ........... 242/597.4 |
| 6,254,029 B1 | * | 7/2001 | Robertson et al. ...... 242/487 |

FOREIGN PATENT DOCUMENTS

FR 1 169 240 A 12/1958

OTHER PUBLICATIONS

International Search Report, International application No.: PCT/US02/39535, Mar. 3, 2003, pp. 1–2.

* cited by examiner

Primary Examiner—Emmanuel Marcelo
(74) Attorney, Agent, or Firm—Fish & Richardson P.C.

(57) ABSTRACT

Methods and apparatus implementing a quick-change spool system. A quick-change spool system includes one or more spools, each spool including a cavity in which there are one or more recesses. The system includes a spool base configured for detachably coupling with a spool support shaft of a fishing reel body, the spool base including a member configured for mating with the cavity of one of the spools. The system includes a retaining mechanism that includes one or more spring-loaded keys that are shaped such that the keys depress when the member of the spool base is being inserted into the cavity of one of the spools and, furthermore, extend to engage the recesses when the member of the spool is fully inserted into the cavity.

31 Claims, 12 Drawing Sheets

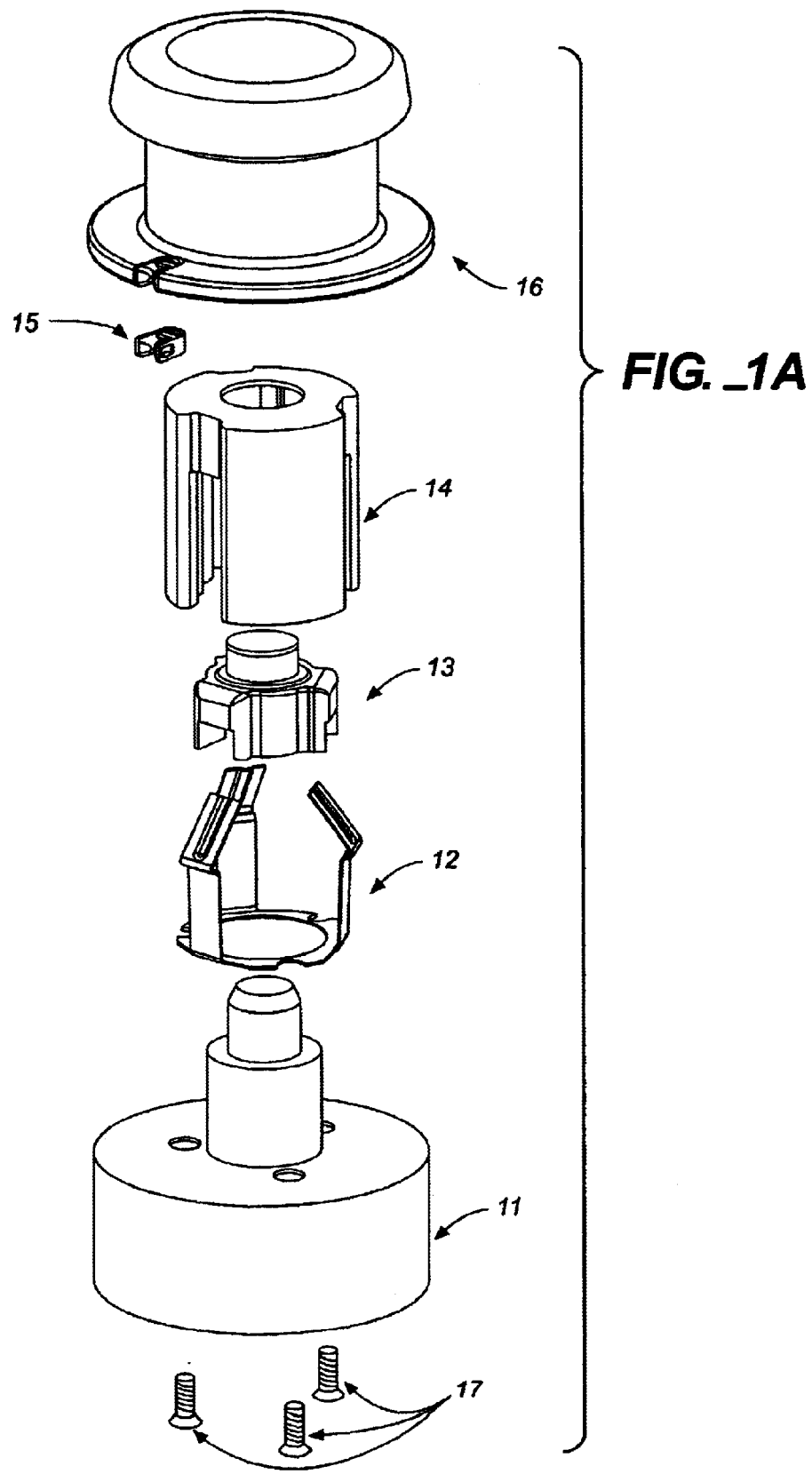
FIG. _1A

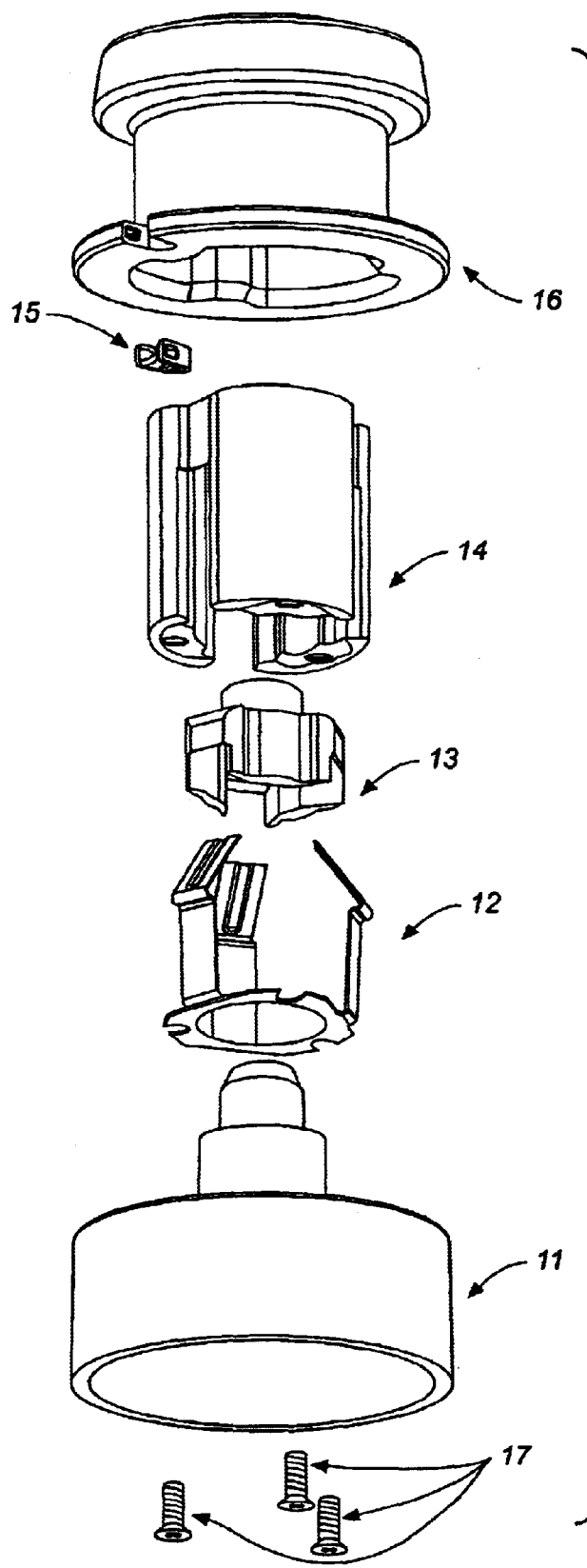
FIG._1B

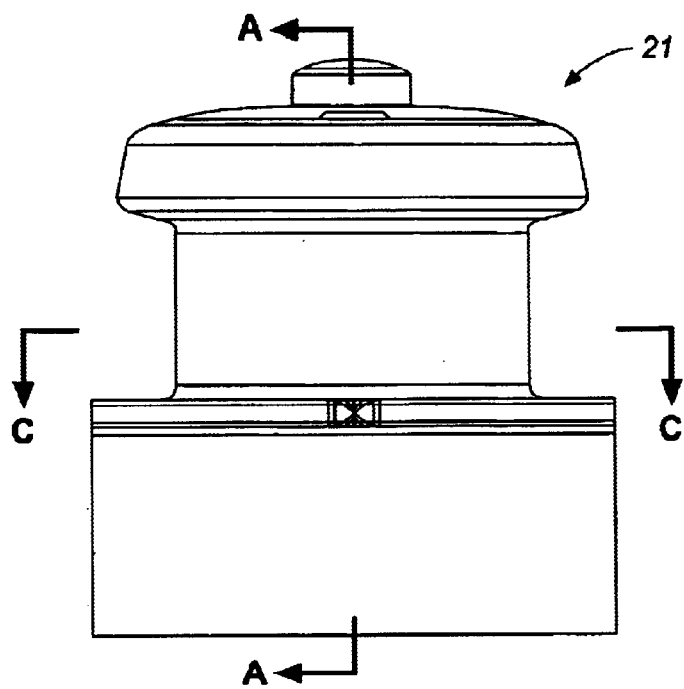
FIG._2A
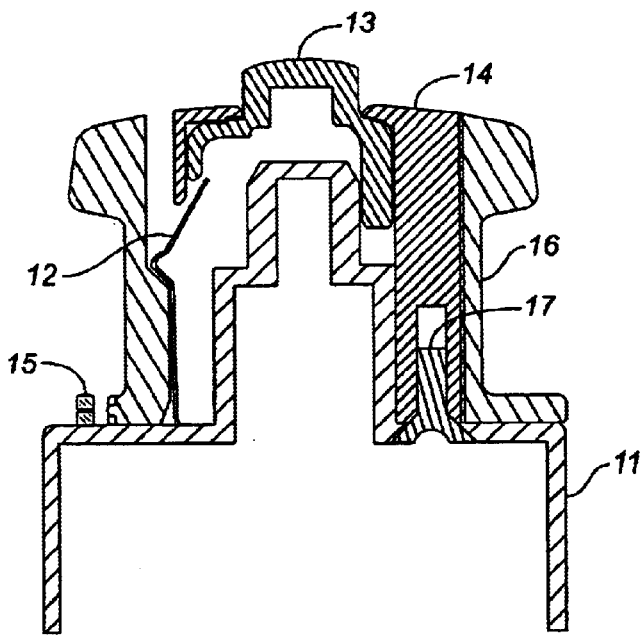
FIG._2B
SECTION A-A
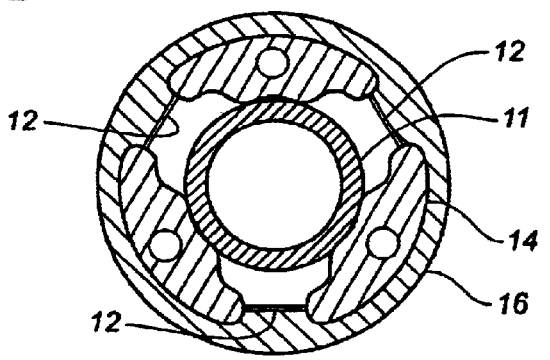
FIG._2C
SECTION C-C

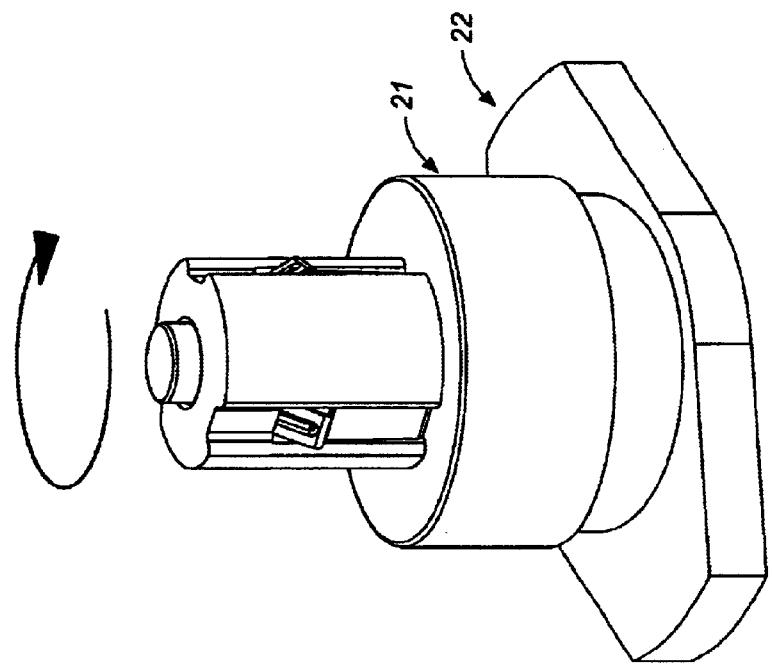
FIG._3B
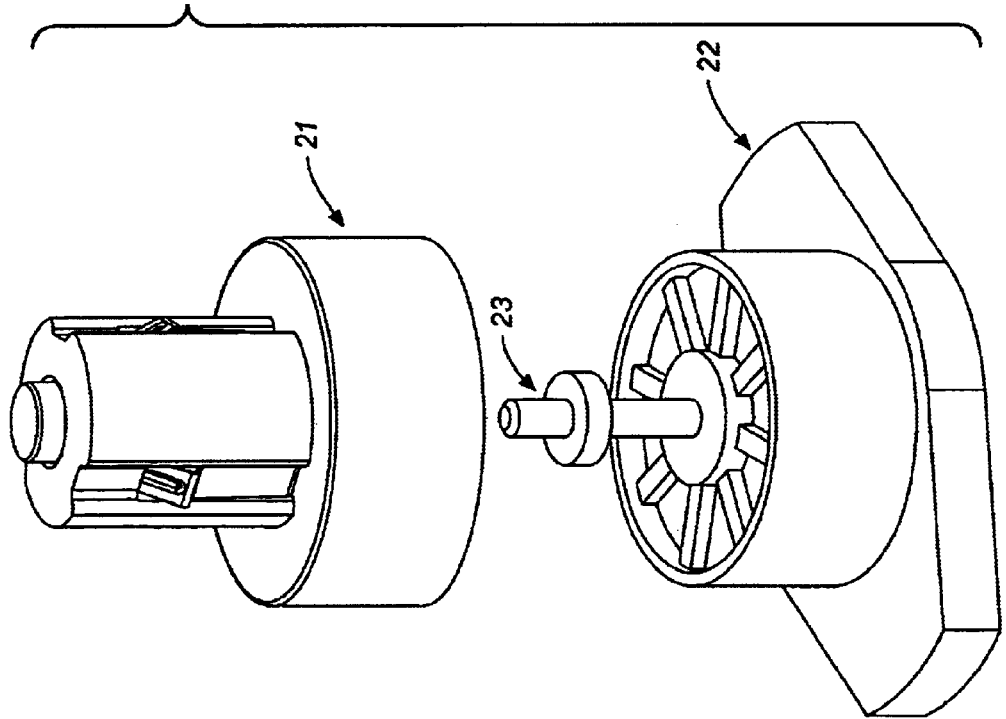
FIG._3A

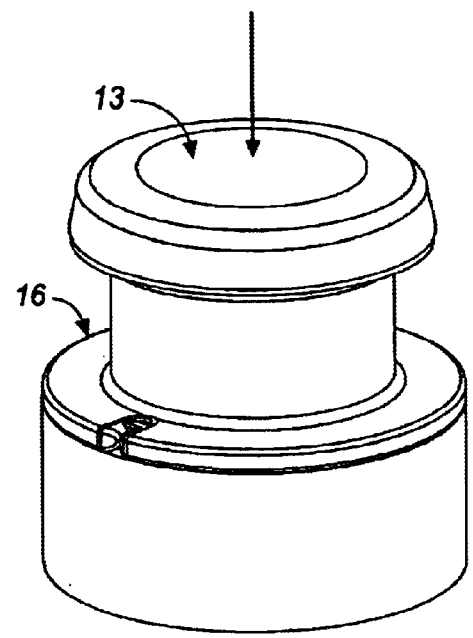
FIG._5A
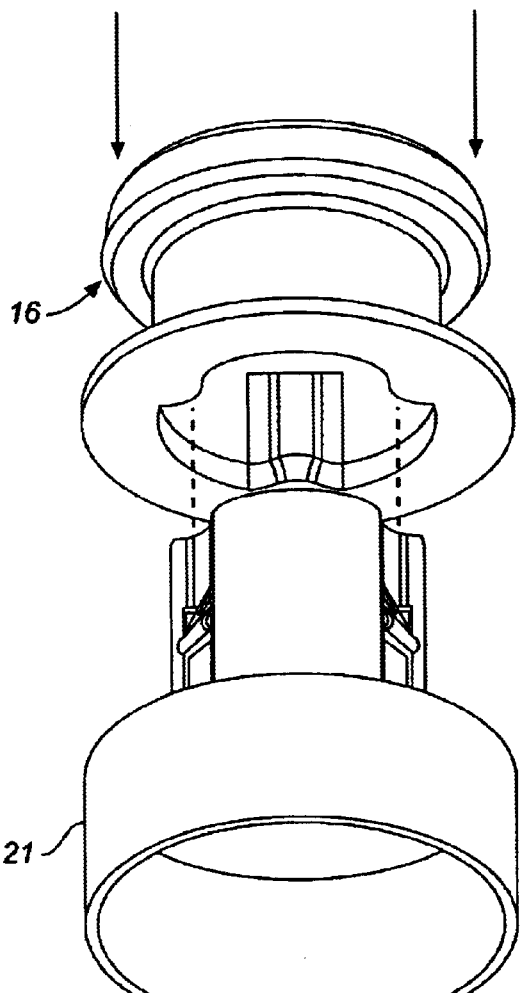
FIG._4
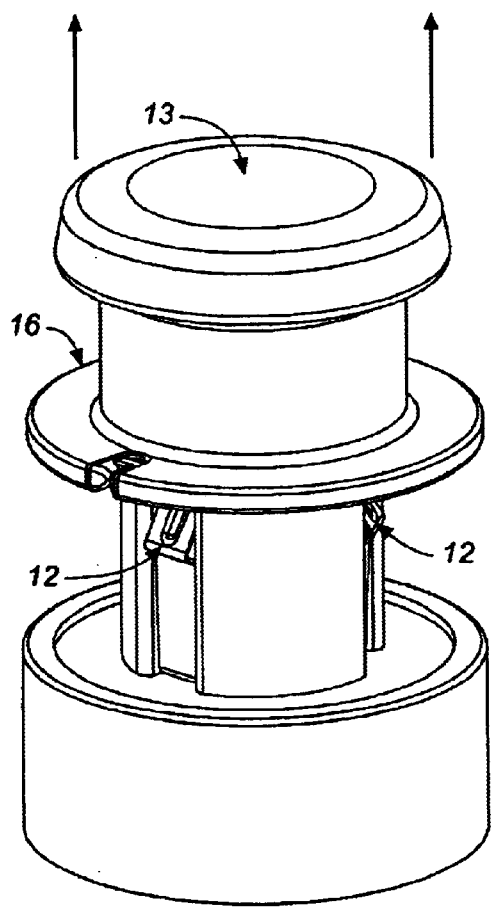
FIG._5B

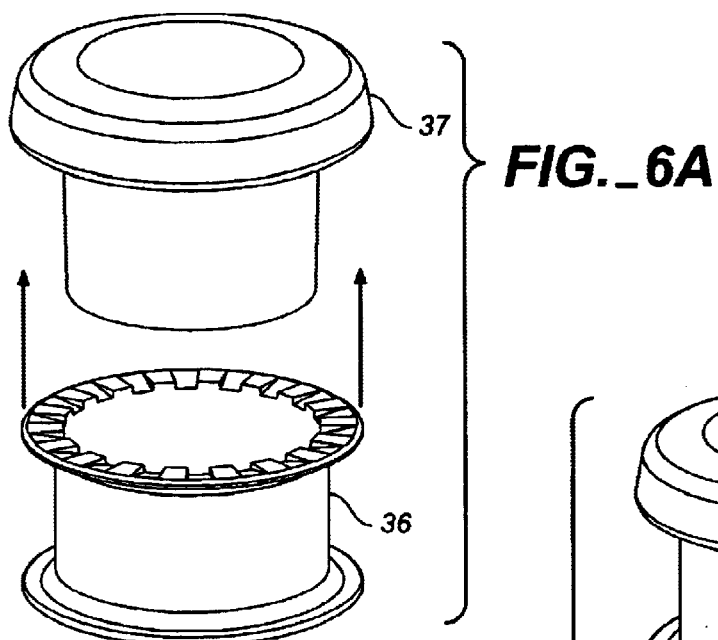
FIG._6A
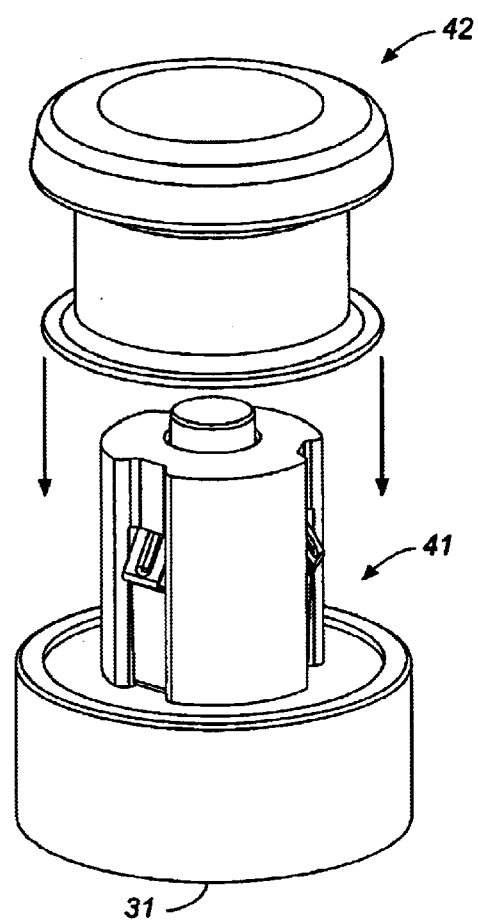
FIG._7
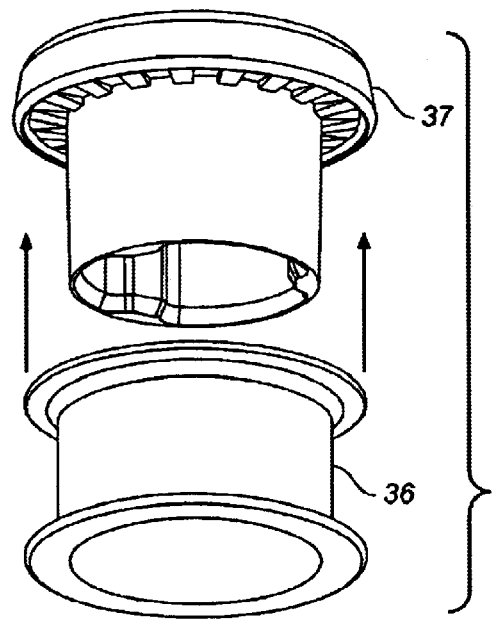
FIG._6B

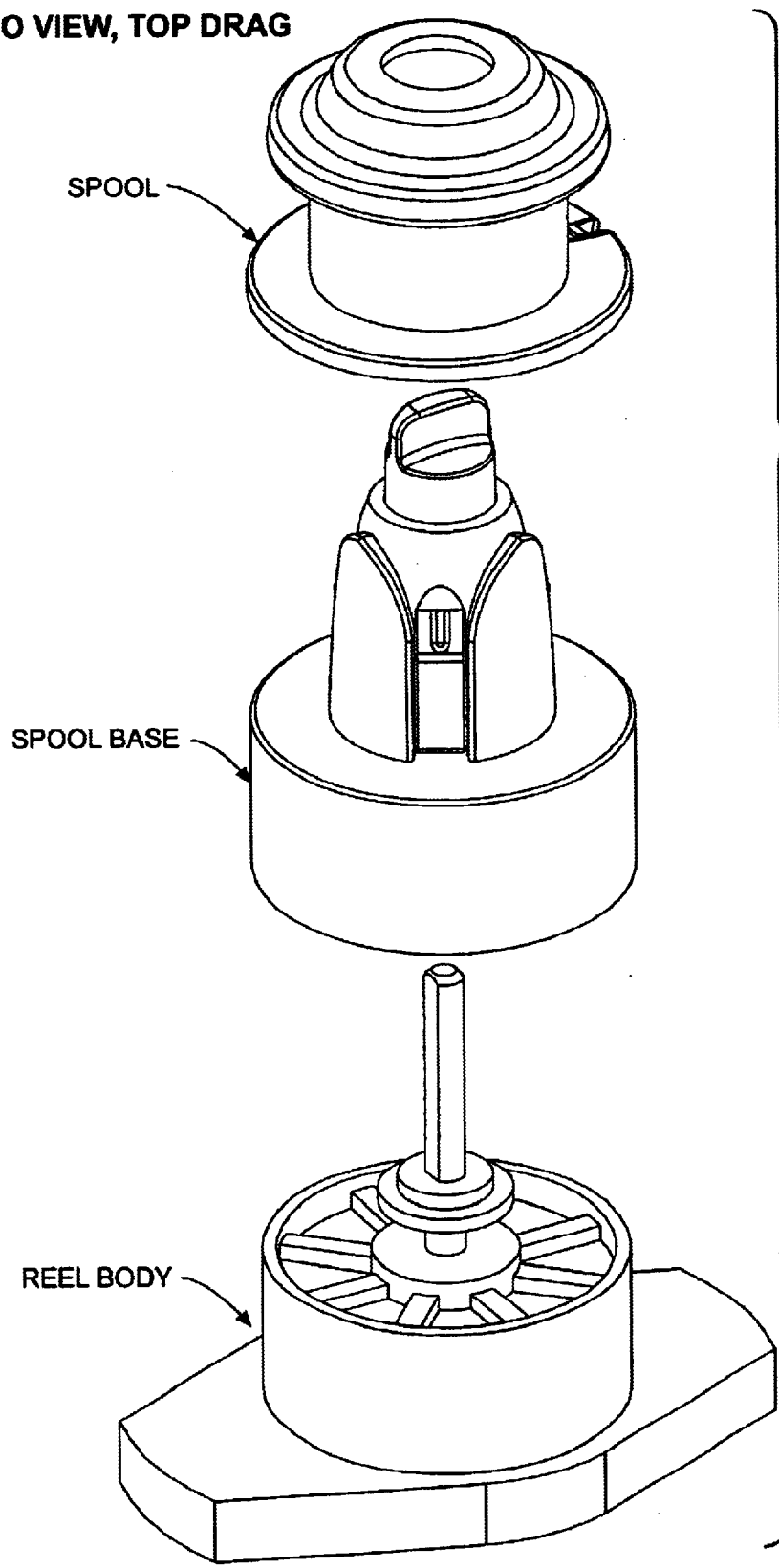

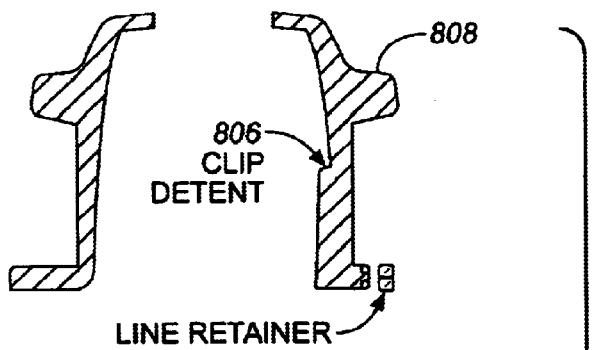
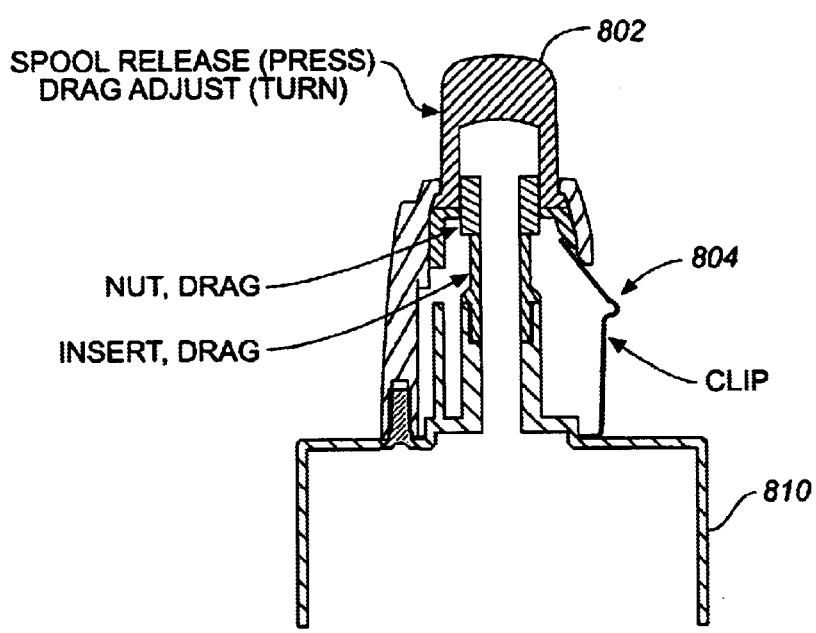
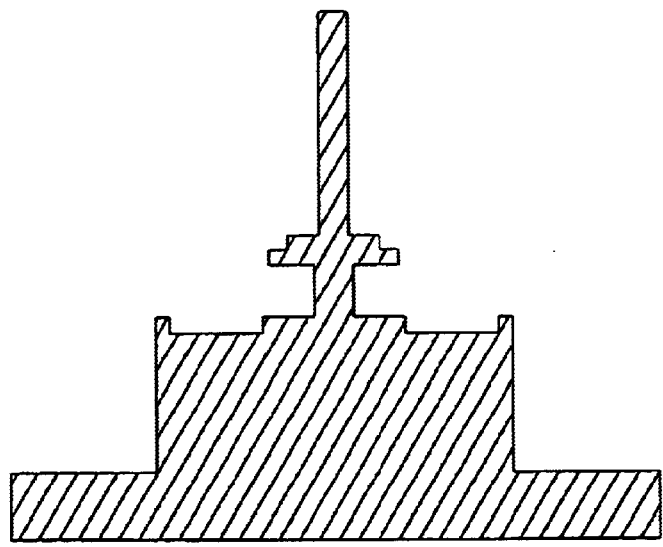
FIG._8B

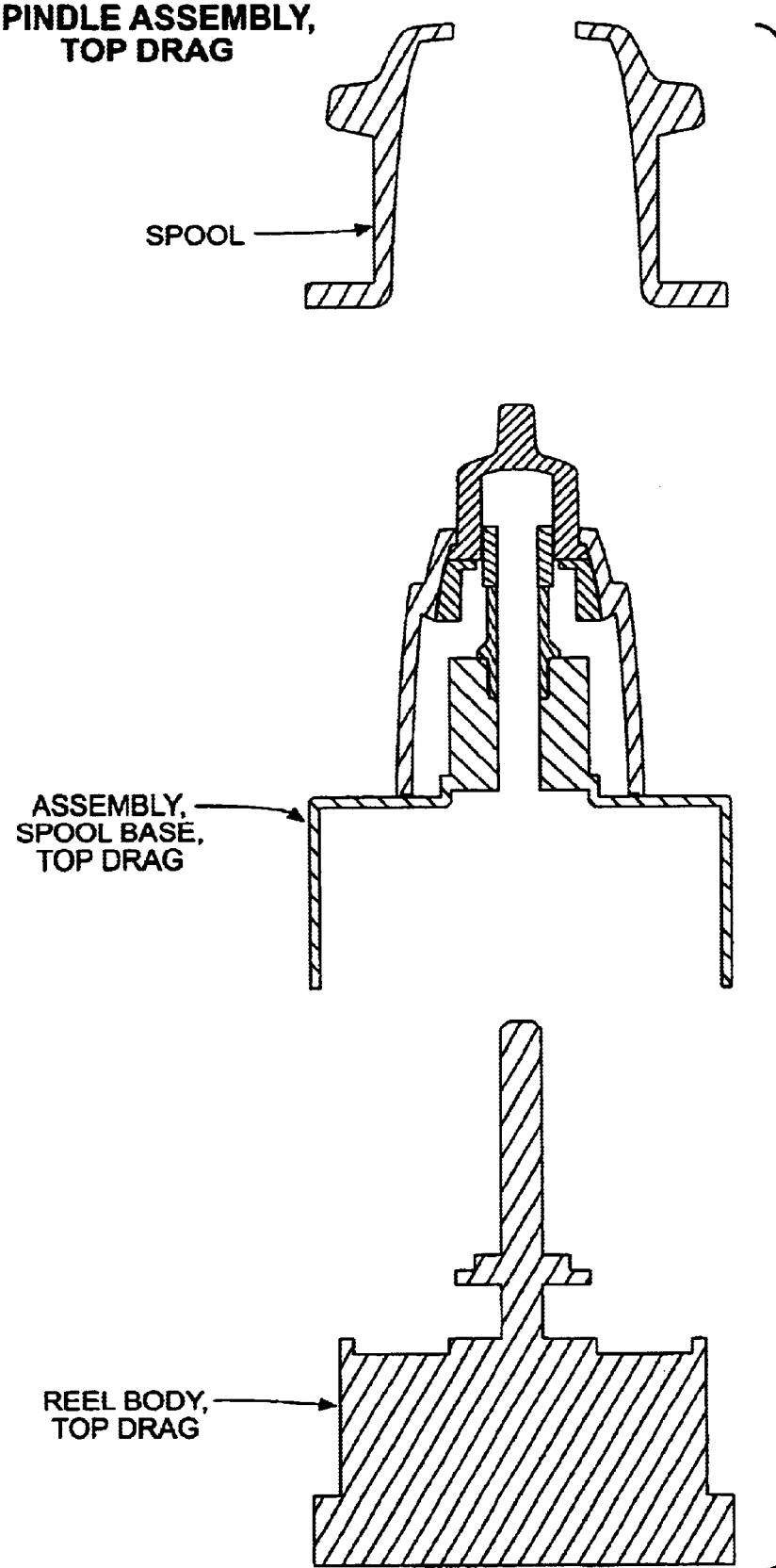
FIG._8C

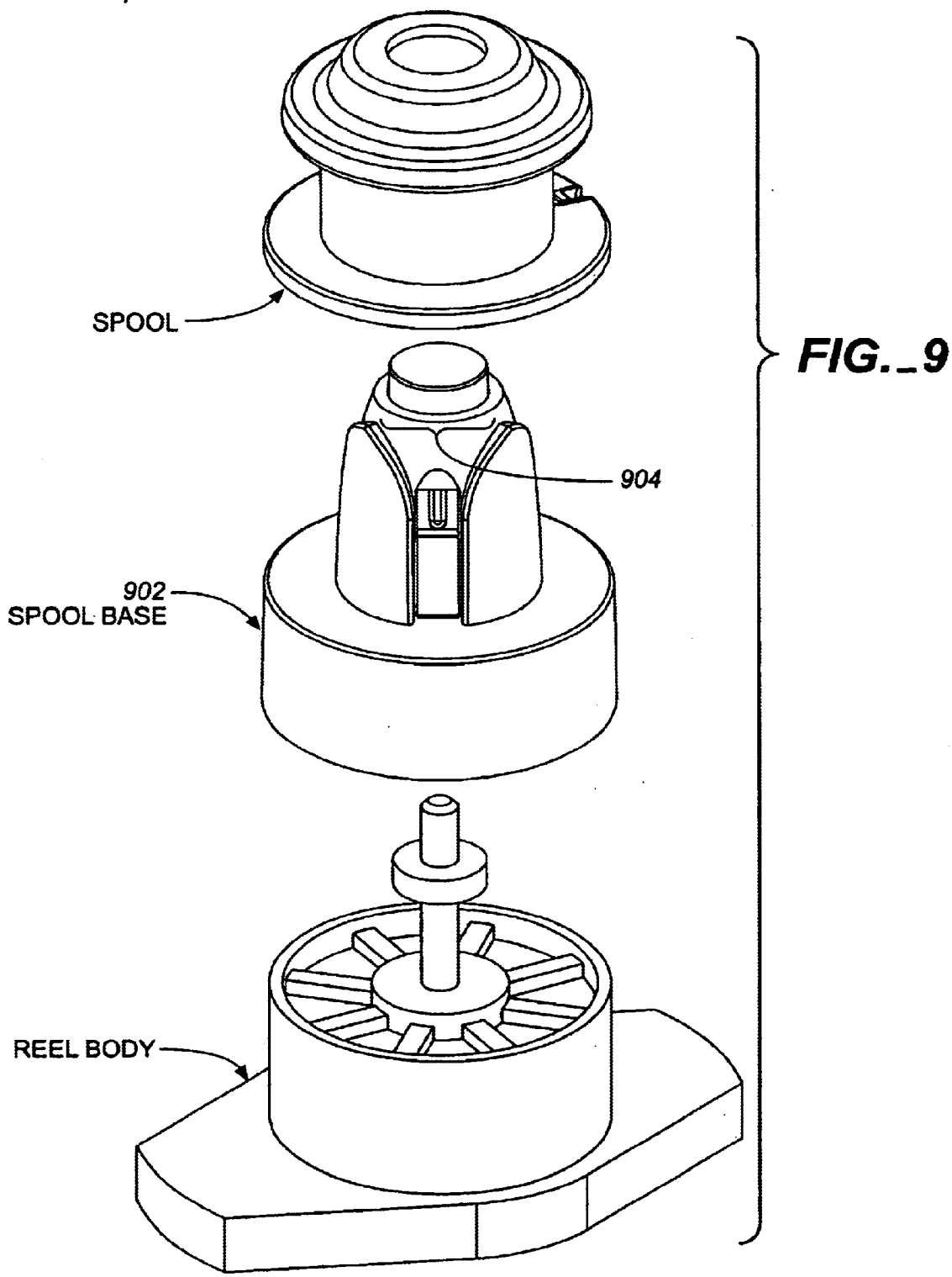

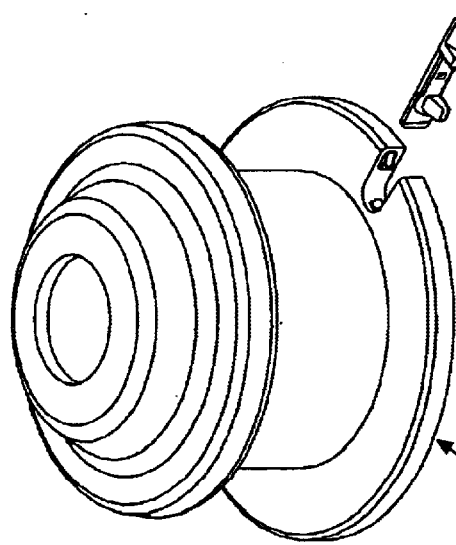
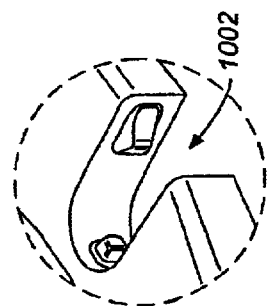
FIG._10A
RETAINER POCKET FIG._10B
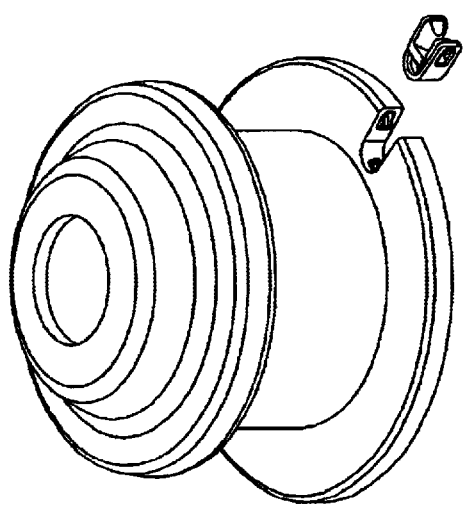
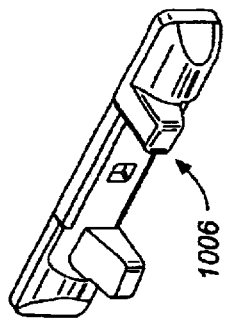
FIG._10D
FREE (AS MOLDED) FIG._10C
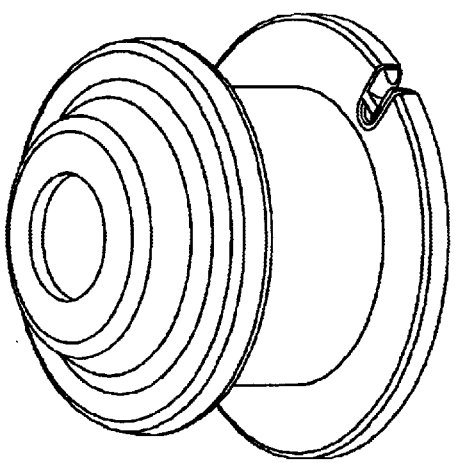
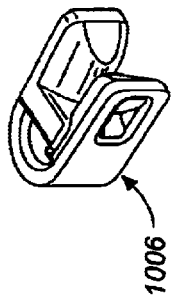
INSTALL FIG._10F
FOLD FIG._10E

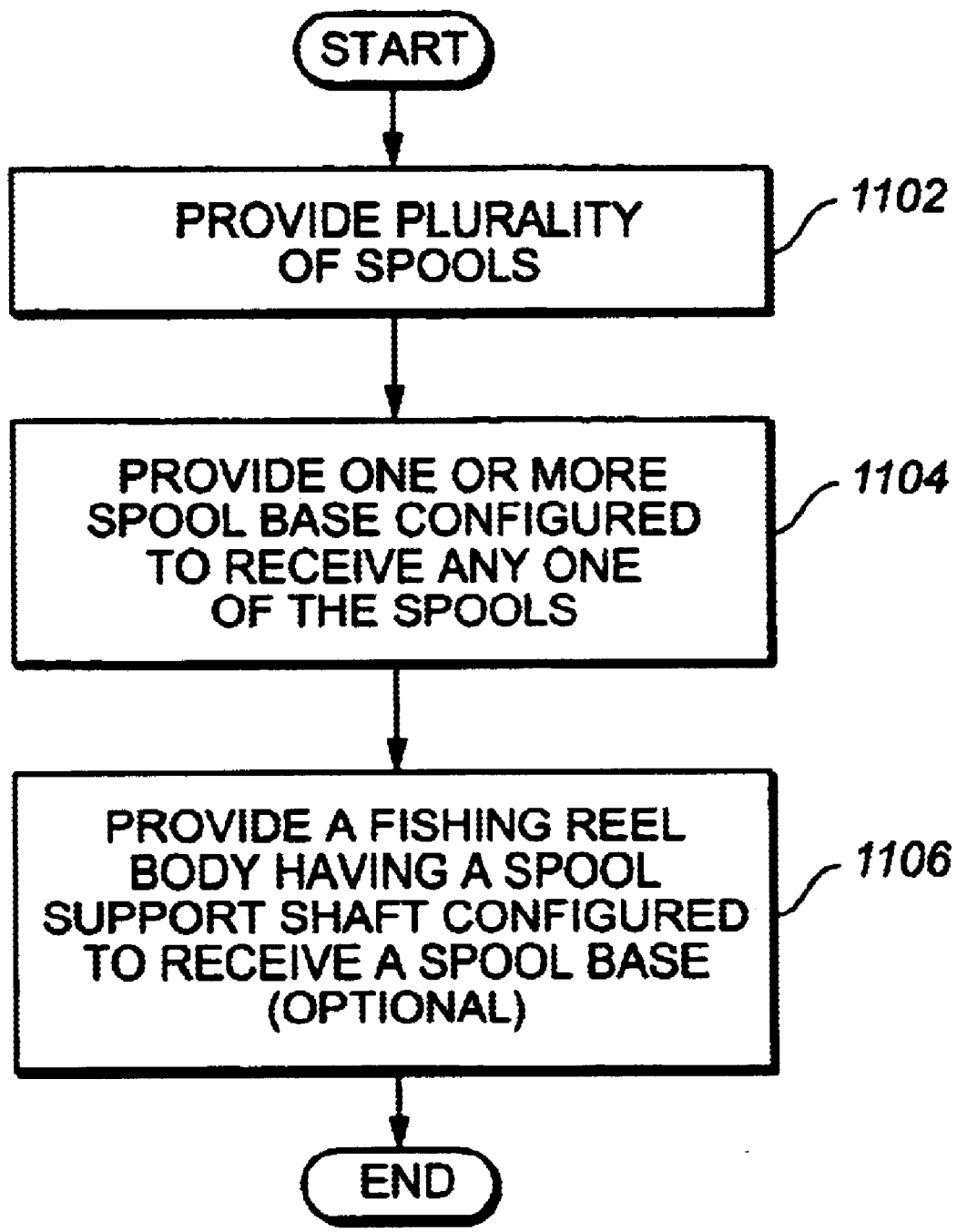
FIG._11

METHODS AND APPARATUS FOR A QUICK-CHANGE SPOOL SYSTEM

CROSS-REFERENCE TO RELATED APPLICATIONS

This application claims priority based on U.S. patent application Ser. No. 60/339,218 entitled Push-Button Quick-Change Spool System For Fishing Reel, filed Dec. 10, 2001, the disclosure of which is incorporated here by reference in its entirety.

BACKGROUND

The present invention relates to fishing reels.

Conventional fishing reels include a spool for holding the fishing line. It is often desirable for a user to change the line on the spool to a line of different strength, length, or type, depending on changing conditions, weight of bait or lures, and size of fish being sought.

With conventional spinning reels, there are two primary ways in which the user can change fishing line on the spool. One method involves manually removing the old line from a fixed spool, tying on the new line, and then winding the new line onto the spool with the reel. A second method involves buying a spare spool and winding a different line on the spare spool. To change lines, the user removes the original spool from the reel and installs the spare spool.

A variety of methods are employed for attaching a spool to a fishing reel. One conventional method of attaching the spool to the reel is threading. Internal threads located in the spool interface with the externally threaded support shaft of the reel. Installation of the spool requires many rotations to achieve full engagement. Likewise, removal of the spool is accomplished through twisting the spool, relative to the reel, through many rotations. Moreover, the drag (on fishing reels with an adjustable drag feature) must be set very tight in order to disengage the threads. The spool itself is generally a complicated, expensive part to manufacture.

SUMMARY

The present invention provides methods and apparatus for a quick-change spool system.

In general, in one aspect, a method for providing a spool system includes providing a plurality of spools each having a fishing line. The method includes providing a spool base configured for receiving any one of the plurality of spools, the spool base being further configured for coupling to a support shaft of a reel body.

In general, in another aspect, a quick-change spool system includes one or more spools, each spool including a cavity in which there are one or more mounting features. Mounting features can include detents and recesses. The system includes a spool base configured for detachably coupling with a spool support shaft of a fishing reel body, the spool base including a member configured for mating with the cavity of one of the spools. The system includes a retaining mechanism that includes one or more spring-loaded catches. The catches can be keys. A catch is shaped such that the catch depress when the member of the spool base is being inserted into the cavity of one of the spools and, furthermore, extend to engage the mounting feature when the member of the spool is fully inserted into the cavity, thereby capturing and fixedly mounting the spool.

In general, in another aspect, a spool system includes a spool base configured for detachably coupling with a spool support shaft of a fishing reel body. The spool base includes a member configured for mating with a cavity of each of one or more spools, each cavity including one or more mounting features. The member includes one or more spring-loaded catches that are shaped such that the catches depress when the member of the spool base is being inserted into the cavity of one of the spools and, furthermore, extend to engage the mounting feature when the member of the spool is fully inserted into the cavity.

In general, in another aspect, a spool system includes one or more spools. Each spool includes a cavity configured to received a member of each of one or more spool bases. Each cavity includes one or more mounting feature. The member includes one or more spring-loaded catches that are shaped such that the catches depress when the member of the spool base is being inserted into the cavity of one of the spools and, furthermore, extend to engage the mounting feature when the member of the spool is fully inserted into the cavity. Each of the spool bases is configured for detachably coupling with a spool support shaft of a fishing reel body.

In general, in another aspect, the quick-change spool system includes a spool base and a spool. The spool base is configured to be detachably coupled to a fishing reel body. The spool is configured to be detachably coupled to the spool base. Furthermore, the spool, the spool base, or both the spool and the spool base can be configured so that the spool can be quickly and easily coupled with and removed from the spool base.

In one implementation, the spool is compact and can be quickly removed from the spool base by a push of a button. The button actuates a mechanism that releases the spool. The mechanism can also act to couple the spool to the spool base. The mechanism can be spring loaded so that coupling does not require pushing the button. The mechanism can be spring loaded so that decoupling does not require pushing the button.

The invention can be implemented to realize one or more of the following advantages. As discussed, the user of a fishing reel often desires to change the type, color, or strength of fishing line on the reel. A quick-change spool system allows the user to quickly change line through the use of multiple spools that have different types of lines. Different lines can be pre-wounded onto different spools. To change a line, one would have to simply change spools.

The changing of spools is achieved with utmost simplicity. Installation of a spool can be accomplished with axial insertion of the spool onto a spool base. The spool, the spool base, or both can include features to guide the spool into correct orientation for engagement with the spool base. That is, the quick-change spool system can be self-aligning and, thus, facilitate installation. Completion of installation can be felt and heard by the user as a spring-clip engages to hold the spool in place. In one implementation, the normal force of multiple splines interlocking with multiple rabbets prevents rotation of the spool relative to the spool base with great structural integrity. Removal of the spool is easy and intuitive. The user need only press a button, placed in obvious view on top of the spool assembly and pull the spool axially away from the reel. If a user attempts to forcibly pull off the spool without pressing the button, the spring-clip will disengage without failure. The change operation can generally be a one handed operation.

A spool can be configured to be coupled with different spool bases. Each of the different spool bases can be configured to be detachably coupled to different types of reel bodies. For example, the same spool can be coupled with a spool base configured to be coupled with a bottom drag reel body and also with a top drag reel body. A spool base can be configured to be coupled with different types of spools.

A spool can be an assembly that includes a line holding member (spool proper) and a line retainer. This line retainer acts to secure the line when the spool is not in use. This line retainer can be manufactured in a variety of dimensions so as to accommodate line of various diameters. In one implementation, this line retainer can be constructed as special geometry molded into the spool. In another implementation, this line retainer can be constructed with a rubber overmold onto the molded spool. In another implementation, this line retainer can be constructed as a detachable piece of plastic or rubber. In a further implementation, this detachable plastic or rubber line retainer can be manufactured in a variety of colors so as to differentiate spools carrying various weights and grades of line. In a further implementation, this detachable plastic or rubber line retainer can be manufactured in a variety of colors so as suit the taste of the user.

A spool can be an assembly that includes a line cartridge and a cap. The line cartridge can be easy to manufacture and can be made available, pre-wound with a variety of line-types, for the great convenience of fishermen utilizing this system. The pre-wound line cartridges can be factory wound at the appropriate tension to reduce line problems such as line tangles and breakage. The pre-wound line cartridges can be disposable, offering advantages such as removal of the need for a user to manually load fishing lines.

A line cartridge can be configured to be coupled with different spool bases. A spool base can also be configured to be coupled with different line cartridges.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 1A and 1B show one implementation of a quick-change spool system.

FIGS. 2A–2C show a front view of the implementation with two projected cross-sectional views.

FIGS. 3A and 3B illustrate how to install a spool assembly to a threaded support shaft of a fishing reel.

FIG. 4 shows how to place a spool onto the spool assembly.

FIGS. 5A and 5B show how the spool can be removed.

FIGS. 6A and 6B show an alternative implementation.

FIG. 7 shows a base of the alternative implementation.

FIGS. 8A–8C show implementations designed for a top drag reel body.

FIG. 9 shows an implementation that includes self-guiding features for coupling a spool to a spool base.

FIGS. 10A–10F show an implementation that includes a line retainer.

FIG. 11 shows a method for providing a quick-change reel system.

Like reference numbers and designations in the various drawings indicate like elements.

DETAILED DESCRIPTION

A quick-change spool system includes one or more spool bases and one or more spools. The system can optionally include one or more reel bodies. In general, a reel body includes a handle mechanically coupled to a spool support shaft. Cranking the handle causes the spool support shaft to oscillate axially and rotate about its longitudinal axis.

A spool base is configured to be detachably coupled to a reel body, usually to the spool support shaft of the reel body. Any mechanism can be used to detachably couple the spool base to the reel body. For example, fasteners such as screws can be used. A single spool base can be configured to be detachably coupled to different reel bodies. Different spool bases can be configured to be detachably coupled with the same reel body. A spool base can be configured to be detachably coupled with different reel bodies. In one implementation, the system includes adaptors for coupling a particular spool base to different reel bodies.

A spool base can be configured to receive one or more spools. The system includes a quick-change mechanism. Specifically, either the spool base, the spool, or both the spool and the spool base can be configured so that so that the spool can be quickly and easily coupled with and removed from the spool base. Alternatively, the system can further include components that provide mechanism for coupling spools to the spool base as described. The components can be considered to be part of the spool base, the spool, or both. A spool base can be configured to detachably couple with different spools. A spool can be configured to be coupled with different spool bases.

Generally, the spools hold fishing lines. Different ones of the one or more spools can hold different types of fishing lines. The fishing lines can be pre-wounded onto the spools (e.g., such as a factory loaded spool). Optionally, one or more of the spools hold a fishing line that is different from fishing lines on other spools. Optionally, the spools are disposable.

The spool can be an assembly that includes a cap and a line cartridge, which holds a fishing line. In this case, the system can include multiple cartridges each having pre-loaded fishing lines (e.g., such as a factory loaded cartridge). Optionally, one or more of the cartridges hold a fishing line that is different from fishing lines on other cartridges. Optionally, the cartridges are disposable.

An Implementation

The following reference numbers are associated with elements shown in FIGS. 1A, 1B, 2A, 2B, 3A, and 3B.

11 base
12 spring-clip
13 button
14 hub
15 line-retainer
16 spool
17 screws
21 base assembly
22 fishing reel (partial)
23 threaded support shaft FIGS. 1A and 1B show one implementation of the system. The implementation shown includes a base 11, a spring-clip 12, a button 13, a hub 14, a line-retainer 15, a spool 16, and three screws 17. The spring-clip 12 is fabricated from hardened stainless steel. The line-retainer 15 can be made of a soft material such as silicone or urethane, with a durometer of approximately 60 Shore A. The base 11, button 13, hub 14, spool 16 are made from plastic or an aluminum alloy and can be machined, injection-molded, or die-cast. The base 11 includes a thread insert on the center axis of its cylindrical body and specified to match the reciprocating, threaded shaft of a popular rear-drag fishing reel. The hub 14 has three holes, which are arranged such as to mate to the three holes through the base 11 and tapped such as to accept the three screws 17.

FIGS. 2A–2C show a front view and two cross-sections of the implementation described above. As seen in section A—A, (FIG. 2B), the screws 17 fasten through base 11 into hub 14, capturing spring-clip 12 and button 13. Spool 16 mates to base 11 and is retained axially by the three detents of spring-clip 12 acting on the ramped upper surfaces of the spool's 16 three internal splines. The splines mate with rabbets in hub 14, as illustrated in section C—C (FIG. 2C). Line-retainer 15 is pressed into the u-shaped recess of spool 16 such that three detents in the u-shaped recess of spool 16 match three recesses in the line-retainer 15, acting to position and retain line retainer 15.

Operation

FIGS. 3A & 3B illustrate how to install the base assembly 21, without the spool 16, to the threaded support shaft 23 of fishing reel 22. As shown, base 11 of base assembly 21 threads on to the threaded support shaft 23 of the fishing reel.

FIG. 4 shows how to place a spool 16 onto the spool assembly 21. The user aligns the three internal splines of spool 16 with the three rabbets in hub 14. The spool 16 is then slid axially onto the assembly, snapping into place as the detents of spring-clip 12 catch over the ramped splines of spool 16.

FIGS. 5A and 5B show how the spool 16 can be removed. The user presses button 13 as shown in FIG. 5A while lifting off spool 16, as shown in FIG. 5B. If the user attempts to forcibly remove the spool 16 without pressing button 13, spring-clip 12 will release without failure.

The user can keep any number of pre-wound spools on hand, each loaded with fishing line of varying specification. Thus, it becomes simple and convenient to change lines. When a spool is not in use, the loose end of line can be inserted into the jaws of the line-retainer 15 and held in place.

An Alternative Implementation

The following reference numbers are associated with elements shown in FIGS. 6A, 6B, and 7.

31 base
36 line-cartridge
37 top-flange
41 lower-assembly
42 cartridge-assembly

As shown in FIGS. 6A and 6B, the spool 16 can be an assembly that includes a line cartridge 36 and cap 37. These two parts can mate in a toothed interface, forming an upper-assembly 42. The line cartridge 36 is designed to maximize manufacturability; it can be injection-molded from an inexpensive polymer. Cap 37 includes internal spline geometry identical to that of spool 16. Cap 37 can be either injection-molded from a hard polymer or die-cast from a metal alloy.

FIG. 7 shows how the base 31 can be slightly modified to accept line-cartridge 36 while maintaining a similar exterior profile of the spool assembly 21.

Operation-Alternative Implementation

The line-cartridge 36 and top-flange 37 slide together axially, the smooth inner cylindrical surface of 36 mating tightly to the cylindrical outer barrel of 37. The two parts mesh in a toothed interface, which prevents rotation of the line-cartridge.

As shown in FIG. 7, the assembly 42 functions in the same manner as the spool 16 as it mates to the lower-assembly 41. The alternative implementation provides line cartridges that are easy to manufacture, inexpensive, and, thus, can be disposable.

Other Alternative Implementations

The above implementations describe a system for coupling with a bottom drag reel. However, the system is not limited to these types of reels. For example, the system can be coupled to a top drag reel. In general, the spool support shaft of a top drag reel penetrates a spool of the reel. The top drag is typically provided by a screw mechanism that, when tightened down, increases the resistance in the rotation of the spool. To accommodate the top drag, the spool base and spool can include apertures so that the spool support shaft can penetrate through these components and be coupled to the top drag.

FIGS. 8A and 8B show one implementation that can be used with a top drag reel. FIG. 8B shows a cross section of the system shown in FIG. 8A. In this implementation, the top drag also acts as a spool release. Other implementations of the system need not incorporate this feature. That is, the drag adjustment knob can, but need not, act as a spool release. As shown, a spool release 802 that also acts as a top drag, when depressed, can cause a clip 804 to bend away from a clip detent 806, thus releasing a spool 808 from a spool base 810. When sufficient force is used to pull the spool 808 away from the spool base 810, the clip 804 can bend away from the clip detent 806 to release the spool, even when the drag adjustment knob/spool release button is not depressed. Sufficient force includes force sufficient to overcome the forced exerted by the clip against the clip detent. The amount of sufficient force can be varied by using different clips. FIG. 8C shows another implementation designed for a top drag reel body.

In one implementation, the spool, the spool base, or both can include features to guide the spool into correct orientation for engagement with the spool base. That is, the quick-change spool system can be self-aligning and, thus, facilitate installation. FIG. 9 shows an implementation that includes a self-aligning feature. As shown, the wide and curved openings of each rabbet of the spool base 902, e.g., opening 904, can receive and guide a mating spline of the inside surface of the spool cavity into a correct orientation. Alternatively, other guiding features can be included. For example, the splines can be shaped to guide the spool to a correct orientation.

In yet another implementation, the system includes a line retainer. The line retainer holds the end of a fishing line and keeps the line from unwrapping. The retainer can reduce instances of line tangles, especially when the spool is removed from the spool base. The line retainer can be made of a soft material that has a high coefficient of friction such as, for example, double-shot rubber (chemically sympathetic rubber such as Kraton), that is molded directly onto the spool. Alternatively, the line retainer can be otherwise implemented, one example of which is shown in FIGS. 10A–10F. The line retaining feature, in this implementation, includes a pocket 1002 at the base of a spool 1004 and also a retainer 1006 made of soft rubber or plastic that holds fishing lines well and accommodates various line diameters. To secure a line, one folds the retainer 1006 around the end of a line and then inserts the retainer into the pocket.

There can be multiple retainers having, for example, different materials and colors. The different color retainers can, for example, allow a user to distinguish between spools (which can then be mass-produced from the same color of plastic) to indicate the line weight and style on the spool. The retainer can be taken out and replaced (when it becomes worn or if, for example, one prefers a certain color or decide to wind a different line on the spool).

A Method for Providing a Quick-Change Spool System

As shown in FIG. 11, an entity such as a retailer or a manufacturer provides one or more spools (step 1102). The spools can hold fishing lines of various sorts. In implementations when the spool includes a line cartridge, the line cartridges hold the fishing line. The spools or line cartridges can be provided pre-loaded with fishing lines, removing the need for the user to wind a fishing line onto a reel. In one implementation, the fishing lines are machine loaded onto the cartridges at an appropriate tension so as to reduce the probability of line problems such as line breaks and line tangles. Optionally, the pre-loaded cartridges are disposable. Thus, when a fishing line is worn, the user simply disposes the cartridge of the worn line and inserts a new cartridge having a new line pre-loaded to reduce line problems.

The entity can manufacture and sell the spools. Alternatively, the entity can license the manufacture and sales of the spools and collect royalties.

The entity provides one or more spool bases (step 1104). The spool base can be configured to receive different spools. A spool can be configured to be detachably coupled with different spools bases. The spool base can be configured to be detachably coupled to different reel bodies. Optionally, the entity can provide adapters that couple a particular spool base to different reel bodies.

The entity can manufacture and sell the spools base. Alternatively, the entity can license the manufacture and sales of the spool base and collect royalties.

Optionally, the entity can provide a reel body (step 1106). The reel body includes a spool support shaft that can be coupled with the spool base. Optionally, the entity can provide any combination of the reel body, spool base, spools, and line cartridges as a kit.

The invention has been described in terms of particular embodiments. Other implementations are within the scope of the following claims. For example, the steps of the invention can be performed in a different order and still achieve desirable results. Any mechanism can be used to detachably couple the spool base to the reel body. Any mechanism can be used to detachably couple any one of the spools to the spool base. Any mechanism can be used to detachably couple a cartridge to a spool base. The system can be used with different types of reels, such as, for example, top drag reels and bottom drag reels. The mechanism for detachably coupling the spool base to the reel body and the mechanism for detachably coupling a cartridge to the spool base can be different. The components can be manufactured from different materials and not just those examples described. The system can include one or more adapters for detachably coupling a particular spool base with different reel bodies. The retaining mechanisms described, including the clip 804 shown in FIG. 8, can be implemented for use with either a top reel body or bottom drag reel body. Similarly, the guide features a line retainer mechanisms described can be implemented for use with either a top reel body or bottom drag reel body. Mounting features can include recesses, detents, as well as any other features that can operate to detachably couple a spool to a spool base. Catches can include spring clips, spring-loaded keys, as well as other features that can operate to detachably couple a spool to a spool base.

What is claimed is:

1. A quick-change spool system, comprising:
one or more spools, each spool including a cavity in which there are one or more mounting features;

a spool base configured for detachably coupling with a spool support shaft of a fishing reel body, the spool base including a member configured for mating with the cavity of one of the spools;

a retaining mechanism that includes one or more spring-loaded catches that are shaped such that the catches depress when the member of the spool base is being inserted into the cavity of one of the spools and, furthermore, extend to engage the mounting feature when the member of the spool is fully inserted into the cavity.

2. The system of claim 1, wherein:

at least one spool is an assembly that includes a first line cartridge and a cap, the first line cartridge being a component of the assembly that holds a first fishing line.

3. The system of claim 2, further comprising:

at least a second line cartridge, the second line cartridge including a second fishing line that is different from the first fishing line.

4. The system of claim 2, wherein:

the first fishing line is factory-wound, at a uniform tension, to the first line cartridge.

5. The system of claim 2, wherein:

the first line cartridge is disposable.

6. The system of claim 1, wherein:

at least one of the spools includes a fishing line.

7. The system of claim 6, wherein:

the fishing line of the at least one spool is factory-wound, at a uniform tension, to the spool.

8. The system of claim 1, wherein:

the retaining mechanism includes a button linked to the spring-loaded catches such that depressing the button causes the spring-loaded catches to depress.

9. The system of claim 1, wherein:

the spring-loaded catches depress when a force sufficient to overcome a force exerted by springs of the spring-loaded catches is exerted so that a spool coupled to the spool base can be removed from the spool base.

10. The system of claim 1, wherein:

the member is a shaft extending along a rotational axis of the spool;

the recesses are detents inside the cavity; and the one or more spring-loaded catches is a spring clip attached to the spool base and extending along the rotational axis of the spool base, the spring clip being operable to be loaded and bend towards the shaft when the shaft is being inserted into the cavity and, furthermore, to unload and unbend to engage the detents when the shaft is fully inserted into the cavity.

11. The system of claim 1, wherein:

spool base is configured to be detachably coupled to different reel bodies.

12. The system of claim 11, wherein:

the spool base is configured to be detachably coupled to a bottom drag reel body; and the spool base and plurality of spools are configured to operate in conjunction with the bottom drag reel body.

13. The system of claim 11, wherein:

the spool base is configured to be detachably coupled to a top drag reel body; and the spool base and plurality of spools are configured to operate in conjunction with the top drag reel body.

14. The system of claim 1, wherein:

the spool base is configured to receive different spools.

15. The system of claim 1, wherein:

the different spools include a spool that is an assembly that includes a line cartridge and a cap, and a spool that is a single component.

16. The system of claim 1, wherein:

at least one spool is configured to be detachably coupled with different spool bases.

17. The system of claim 1, further comprising:

one or more adapters for detachably coupling the spool base to different reel bodies.

18. The system of claim 1, wherein:

the spool and spool base include self-aligning features for coupling.

19. A spool system, comprising:

a spool base configured for detachably coupling with a spool support shaft of a fishing reel body, wherein the spool base includes a member configured for mating with a cavity of each of one or more spools, each cavity including one or more recesses; and wherein the member includes one or more spring-loaded keys that are shaped such that the keys depress when the member of the spool base is being inserted into the cavity of one of the spools and, furthermore, extend to engage the recesses when the member of the spool is fully inserted into the cavity.

20. The spool system of claim 19, further comprising:

a button linked to the spring-loaded keys such that depressing the button causes the spring-loaded keys to depress.

21. The spool system of claim 19, wherein:

the spring-loaded keys depress when a force sufficient to overcome a force exerted by springs of the spring-loaded keys is exerted so that a spool coupled to the spool base can be removed from the spool base.

22. The spool system of claim 19, wherein:

the member is a shaft extending along a rotational axis of the spool;

the recesses are detents inside the cavity; and the one or more spring-loaded catches is a spring clip attached to the spool base and extending along the rotational axis of the spool base, the spring clip being operable to be loaded and bend towards the shaft when the shaft is being inserted into the cavity and, furthermore, to unload and unbend to engage the detents when the shaft is fully inserted into the cavity.

23. The spool system of claim 19, wherein:

the spool base is configured to be detachably coupled to different reel bodies.

24. The spool system of claim 19, wherein:

the spool base is configured to be detachably coupled to a bottom drag reel body.

25. The spool system of claim 19, wherein:

the spool base is configured to be detachably coupled to a top drag reel body.

26. The spool system of claim 19, wherein:

one or more adapters for detachably coupling the spool base to different reel bodies.

27. A spool system, comprising:

one or more spools, each spool including a cavity configured to received a member of each of one or more spool bases, each cavity including one or more recesses, wherein the member includes one or more spring-loaded keys that are shaped such that the keys depress when the member of the spool base is being inserted into the cavity of one of the spools and, furthermore, extend to engage the recesses when the member of the spool is fully inserted into the cavity, and wherein each of the spool bases is configured for detachably coupling with a spool support shaft of a fishing reel body.

28. The spool system of claim 27, wherein:

at least one spool is an assembly that includes a first line cartridge and a cap, the first line cartridge being a component of the assembly that holds a first fishing line.

29. The system of claim 28, further comprising:

at least a second line cartridge, the second line cartridge including a second fishing line that is different from the first fishing line.

30. The system of claim 28, wherein:

the first fishing line is factory-wound, at a uniform tension, to the first line cartridge.

31. The system of claim 28, wherein:

the first line cartridge is disposable.

* * * * *